(12) United States Patent
Park

(10) Patent No.: US 12,407,006 B2
(45) Date of Patent: Sep. 2, 2025

(54) FUEL CELL SYSTEM AND CONTROL METHOD THEREOF

(71) Applicants: HYUNDAI MOTOR COMPANY, Seoul (KR); KIA CORPORATION, Seoul (KR)

(72) Inventor: Min Gu Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 503 days.

(21) Appl. No.: 17/894,035

(22) Filed: Aug. 23, 2022

(65) Prior Publication Data

US 2023/0299313 A1  Sep. 21, 2023

(30) Foreign Application Priority Data

Mar. 21, 2022 (KR) .................. 10-2022-0034920

(51) Int. Cl.
| | |
|---|---|
| *H01M 8/04* | (2016.01) |
| *H01M 8/04082* | (2016.01) |
| *H01M 8/04089* | (2016.01) |
| *H01M 8/04302* | (2016.01) |
| *H01M 8/04537* | (2016.01) |
| *H01M 8/04791* | (2016.01) |

(52) U.S. Cl.
CPC ... *H01M 8/04097* (2013.01); *H01M 8/04201* (2013.01); *H01M 8/04302* (2016.02); *H01M 8/04604* (2013.01); *H01M 8/04798* (2013.01); *H01M 2250/20* (2013.01)

(58) Field of Classification Search
CPC ......... H01M 8/04097; H01M 8/04302; H01M 8/04201; H01M 8/04798; H01M 2250/20
USPC ......................................................... 429/400
See application file for complete search history.

(56) References Cited

U.S. PATENT DOCUMENTS

| | | |
|---|---|---|
| 8,808,934 B2 | 8/2014 | Wilson et al. |
| 9,401,520 B2 | 7/2016 | Furusawa et al. |
| 9,614,236 B2 | 4/2017 | Yu et al. |
| 9,806,356 B2 | 10/2017 | Maslyn et al. |
| 10,153,500 B2 | 12/2018 | Paganelli |
| 2008/0038602 A1 | 2/2008 | Yu et al. |
| 2011/0171547 A1 | 7/2011 | Wilson et al. |
| 2012/0308906 A1 | 12/2012 | Paganelli |
| 2013/0196240 A1 | 8/2013 | Furusawa et al. |
| 2015/0280258 A1 | 10/2015 | Maggiore et al. |
| 2015/0380753 A1* | 12/2015 | Taruya ............. H01M 8/04798 429/429 |
| 2016/0087288 A1 | 3/2016 | Maslyn et al. |
| 2021/0104758 A1* | 4/2021 | Tanimoto .......... H01M 8/04567 |

FOREIGN PATENT DOCUMENTS

| | | |
|---|---|---|
| JP | 2012504848 A | 2/2012 |
| JP | 5091584 B2 | 12/2012 |
| JP | 2013171730 A | 9/2013 |

(Continued)

*Primary Examiner* — James M Erwin
(74) *Attorney, Agent, or Firm* — Lempia Summerfield Katz LLC

(57) ABSTRACT

A fuel cell system and a control method thereof reduce a hydrogen exhaust amount and perform precise control in a low output section through the control of an air recirculation line and an air recirculation valve that recirculate the air discharged from the cathode of a fuel cell stack to the cathode.

12 Claims, 4 Drawing Sheets

(56) References Cited

FOREIGN PATENT DOCUMENTS

| | | | |
|---|---|---|---|
| JP | 5504293 | B2 | 5/2014 |
| JP | 2016072242 | A | 5/2016 |
| JP | 2017513190 | A | 5/2017 |
| JP | 6256270 | B2 | 1/2018 |
| KR | 20120103602 | A | 9/2012 |
| KR | 101748275 | B1 | 6/2017 |
| KR | 102164365 | B1 | 10/2020 |
| WO | 2010039109 | A1 | 4/2010 |

\* cited by examiner

FUEL CELL SYSTEM AND CONTROL METHOD THEREOF

CROSS REFERENCE TO RELATED APPLICATION

The present application claims priority to Korean Patent Application No. 10-2022-0034920, filed Mar. 21, 2022, the entire contents of which are incorporated herein for all purposes by this reference.

BACKGROUND OF THE DISCLOSURE

Field of the Disclosure

The present disclosure relates to a fuel cell system and control method thereof. More particularly, the present disclosure relates to a fuel cell system and control method thereof capable of reducing an amount of hydrogen exhaust and enabling a precise control in a low output section by controlling an air recirculation line and an air recirculation valve that recirculate air discharged from a cathode of a fuel cell stack to the cathode.

Description of the Related Art

A fuel cell is a device that receives hydrogen and air from an outside and generates electrical energy through an electrochemical reaction inside a fuel cell stack. The fuel cell can be used as a power source for driving a motor of an ecofriendly vehicle such as a fuel cell electric vehicle (FCEV).

A fuel cell vehicle includes a fuel cell stack in which a plurality of fuel cell cells used as a power source is stacked, a fuel supply system for supplying hydrogen as fuel to the fuel cell stack, an air supply system for supplying oxygen, an oxidizing agent required for electrochemical reactions, and a thermal management system for controlling the temperature of the fuel cell stack using coolant and the like.

The fuel supply system depressurizes compressed hydrogen inside a hydrogen tank and supplies the hydrogen to the anode (fuel electrode) of the fuel cell stack. The air supply system operates an air compressor to supply inhaled outside air to the cathode (air electrode) of the fuel cell stack.

The oxygen contained in the air supplied to the cathode generates electrical energy through an electrochemical reaction with the hydrogen supplied to the anode. A byproduct of the reaction (referring to generated water (water), high-temperature heat generated according to the electrochemical reaction, etc.) and exhaust gas (referring to unreacted hydrogen and oxygen, etc.) are discharged to the outside of the vehicle through an air exhaust line.

Since unreacted hydrogen is included in these exhaust gases and byproducts, some hydrogen is not completely discharged from the air exhaust line and remains inside the air exhaust line. In other words, residual hydrogen is present in the air exhaust line.

Conventionally, in order to minimize the risk of explosion or ignition due to the residual hydrogen, the residual hydrogen is discharged by driving the air compressor when the fuel cell operation is terminated or restarted. However, as additional output is required for driving the air compressor and residual hydrogen is discharged at once, there is a problem that the legal standards for hydrogen exhaust concentration cannot be met.

According to the Global Technical Regulation (GTR) currently in effect worldwide, the allowable concentration of hydrogen gas exhausted from the fuel cell system should be up to 8% or less, and the average measurement for 3 seconds should not exceed 4%.

Therefore, there is an urgent need for a technology capable of maintaining the concentration of hydrogen exhausted from the fuel cell system below a certain level without additional driving of a device such as an air compressor.

Meanwhile, due to the characteristics of an air compressor to which an air foil bearing is generally applied, it is difficult to precisely control the rotation speed of the air compressor when the fuel cell vehicle travels in a low speed section. In other words, there is a problem in that the minimum demand output in the low output section is excessively increased.

Conventionally, in order to avoid the excessive output problem, the minimum flow rate control method of temporarily stopping the fuel cell or blocking the air exhaust line has been applied.

However, when the fuel cell is temporarily stopped frequently, the durability of the fuel cell is shortened, and when the minimum flow rate control is performed, there is a problem in that the pressure in the fuel cell stack increases and the crossover of oxygen from the cathode to the anode occurs.

The matters described as the background art above are only to improve understanding of the background of the present disclosure. The above should not be taken as acknowledging that the matters correspond to the prior art already known to those of ordinary skill in the art.

SUMMARY

The present disclosure has been proposed to solve the above problems. An object of the present disclosure is to provide a fuel cell system and a control method thereof capable of reducing a hydrogen exhaust amount and performing precise control in a low output section through the control of an air recirculation line and an air recirculation valve that recirculate the air discharged from the cathode of a fuel cell stack to the cathode.

In order to achieve the above object, a fuel cell system according to the present disclosure includes an air supply line to supply air to a fuel cell stack and an air exhaust line to discharge air after reaction to an outside. The fuel cell system also includes an air recirculation line having one side branched from the air exhaust line and the other side connected to the air supply line to recirculate the air after reaction. The fuel cell system also includes an air recirculation valve provided in the air recirculation line to control a degree of recirculation of the air after reaction. The fuel cell system also includes a controller to control an opening degree of the air recirculation valve when recirculation of the air after reaction is required The air recirculation valve of the fuel cell system according to the present disclosure may be provided in the air recirculation line and may be provided at a point where the air recirculation line and the air supply line are connected.

The fuel cell system according to the present disclosure may further include an air supply valve provided in the air supply line to supply the air to the fuel cell stack and having a bypass line connected to the air exhaust line therein. The controller may control the opening degree of the air supply valve and at the same time may control the opening degree of the air recirculation valve when the recirculation of the air after reaction is required.

The fuel cell system according to the present disclosure may further include an air exhaust valve provided in the air exhaust line to discharge the air after reaction that has passed through the fuel cell stack to the outside. When the recirculation of the air after reaction is required, the controller may control the opening degree of the air recirculation valve and may simultaneously control the opening degree of the air exhaust valve.

In the fuel cell system according to the present disclosure, when the recirculation of the air after reaction is required may be either a mode of reducing concentration of exhaust hydrogen or a mode of reducing concentration of oxygen flowing into the fuel cell stack.

The fuel cell system according to the present disclosure may further include an air supply valve provided in the air supply line to supply the air to the fuel cell stack and having a bypass line connected to the air exhaust line therein. In the mode of reducing the concentration of exhaust hydrogen, the controller may close the opening degree of the air recirculation valve according to a preset reference value and may fully open the air supply valve.

The fuel cell system according to the present disclosure may further include an air exhaust valve provided in the air discharge line to discharge the air that has passed through the fuel cell stack to the outside. In the mode of reducing the concentration of exhaust hydrogen, the controller may close the opening degrees of the air recirculation valve and the air exhaust valve according to the preset reference value and may fully open the air supply valve.

The fuel cell system according to the present disclosure may further include an air supply valve provided in the air supply line to supply the air to the fuel cell stack and having a bypass line connected to the air exhaust line therein. In the mode of reducing the concentration of oxygen flowing into the fuel cell stack, the controller may close the opening degrees of the air recirculation valve and air supply valve according to a preset reference value based on a demand output.

The fuel cell system according to the present disclosure may further include an air exhaust valve provided in the air exhaust line to discharge the air that has passed through the fuel cell stack to the outside. In the mode of reducing the concentration of oxygen flowing into the fuel cell stack, the controller may close the opening degrees of the air recirculation valve, the air exhaust valve, and the air supply valve according to the preset reference value based on the demand output.

A control method of the fuel cell system according to the present disclosure includes the steps of performing the mode of reducing the concentration of exhaust hydrogen by the controller and performing the mode of reducing the concentration of oxygen flowing into the fuel cell stack by the controller.

In the control method according to the present disclosure, the step of performing the mode of reducing the concentration of exhaust hydrogen may be performed when the fuel cell system is started.

In the control method according to the present disclosure, the step of performing the mode for reducing the concentration of oxygen flowing into the fuel cell stack may be performed when a demand output during operation of the fuel cell system is less than or equal to a predetermined reference value.

According to the fuel cell system and its control method of the present disclosure, by controlling the air recirculation line and the air recirculation valve that recirculate the air discharged from the cathode of the fuel cell stack to the cathode, it is possible to reduce the hydrogen exhaust amount and to perform a precise control in the low output section.

Specifically, it is possible to satisfy the hydrogen emission regulation standard by maintaining the concentration of hydrogen exhausted from the fuel cell system below a certain level without additional driving of a device such as an air compressor.

In addition, by controlling the concentration of oxygen flowing into the fuel cell stack for operation in the low power section, it not only enables precise control in the low output section without temporarily stopping the fuel cell or performing minimum flow control, but also has the advantage of minimizing side effects such as fuel cell stack deterioration by preventing oxygen crossover.

DETAILED DESCRIPTION

Throughout this specification, when a part "includes" a certain component, it means that other components may be further included, rather than excluding other components, unless otherwise stated.

In addition, terms such as first and/or second may be used to describe various components. However, these terms are used only for the purpose of distinguishing one component from another component. For example, without departing from the scope of the present disclosure, a first component may be called a second component, and similarly the second component may also be referred to as the first component. When a component, device, element, or the like of the present disclosure is described as having a purpose or performing an operation, function, or the like, the component, device, or element should be considered herein as being "configured to" meet that purpose or to perform that operation or function.

Hereinafter, the configuration and operating principle of various embodiments of the present disclosure are described in detail with reference to the accompanying drawings.

Figure 1:
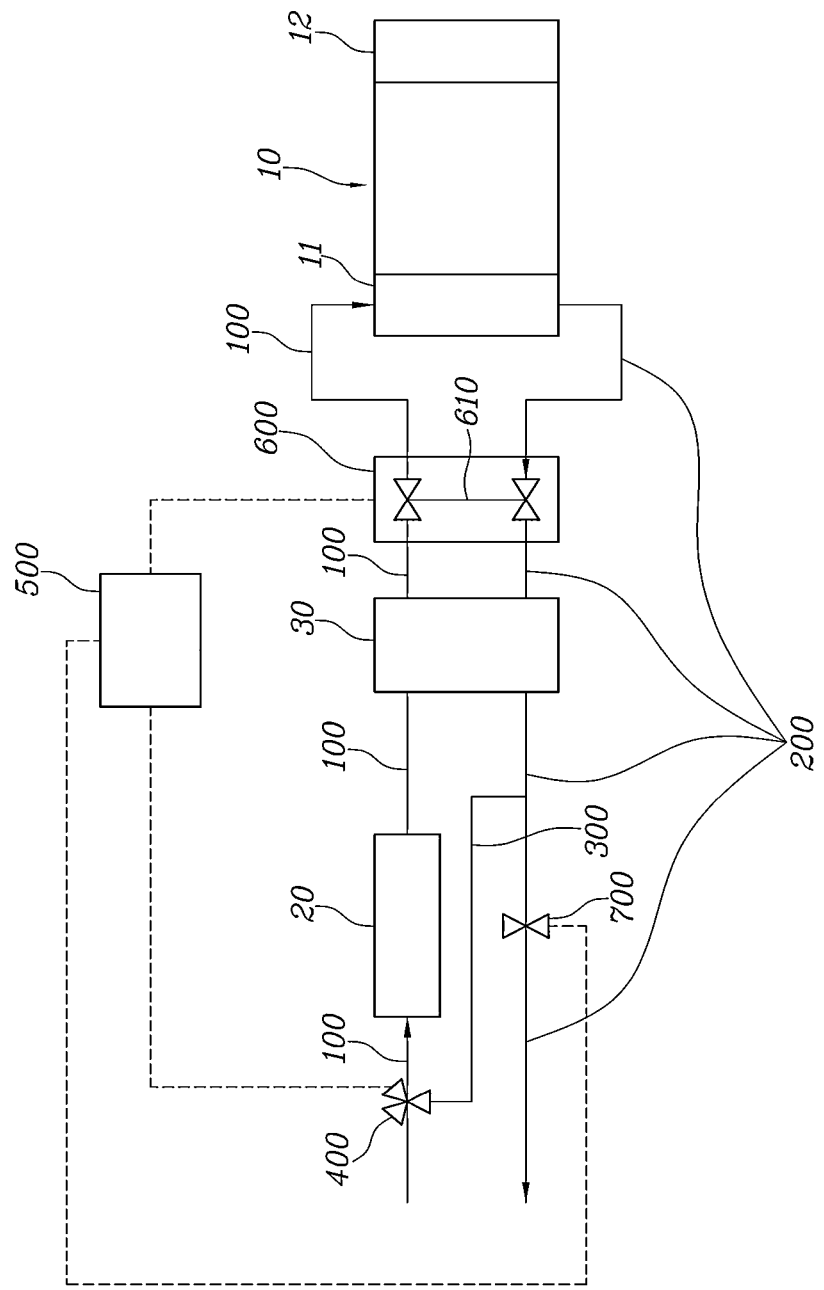
FIG. 1 is a view showing a fuel cell system according to an embodiment of the present disclosure.
Figure 2:
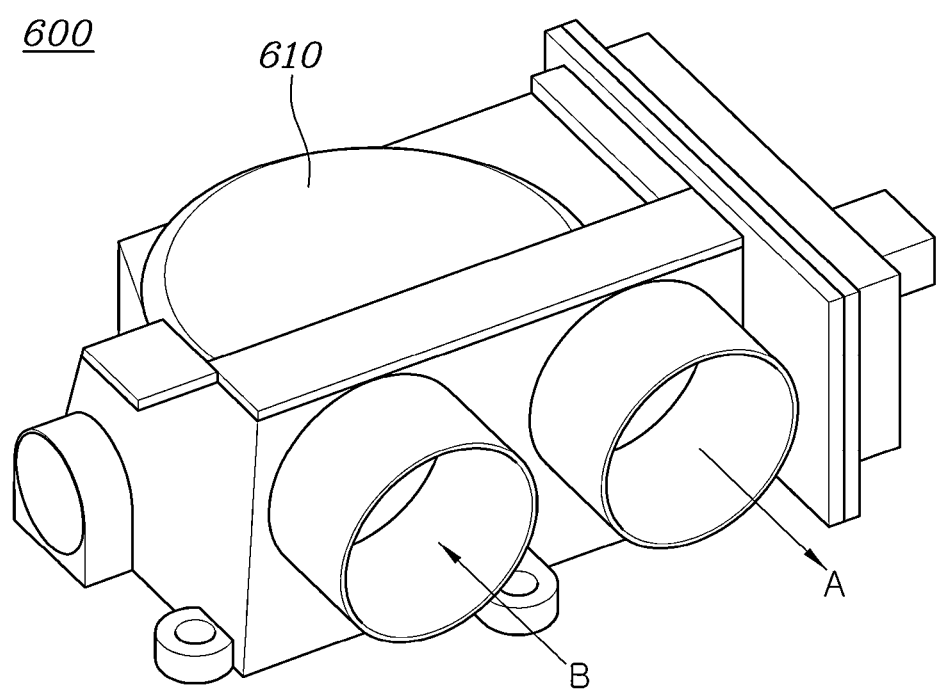
FIG. 2 is a view showing an air supply valve of a fuel cell system according to an embodiment of the present disclosure.
Figure 3:
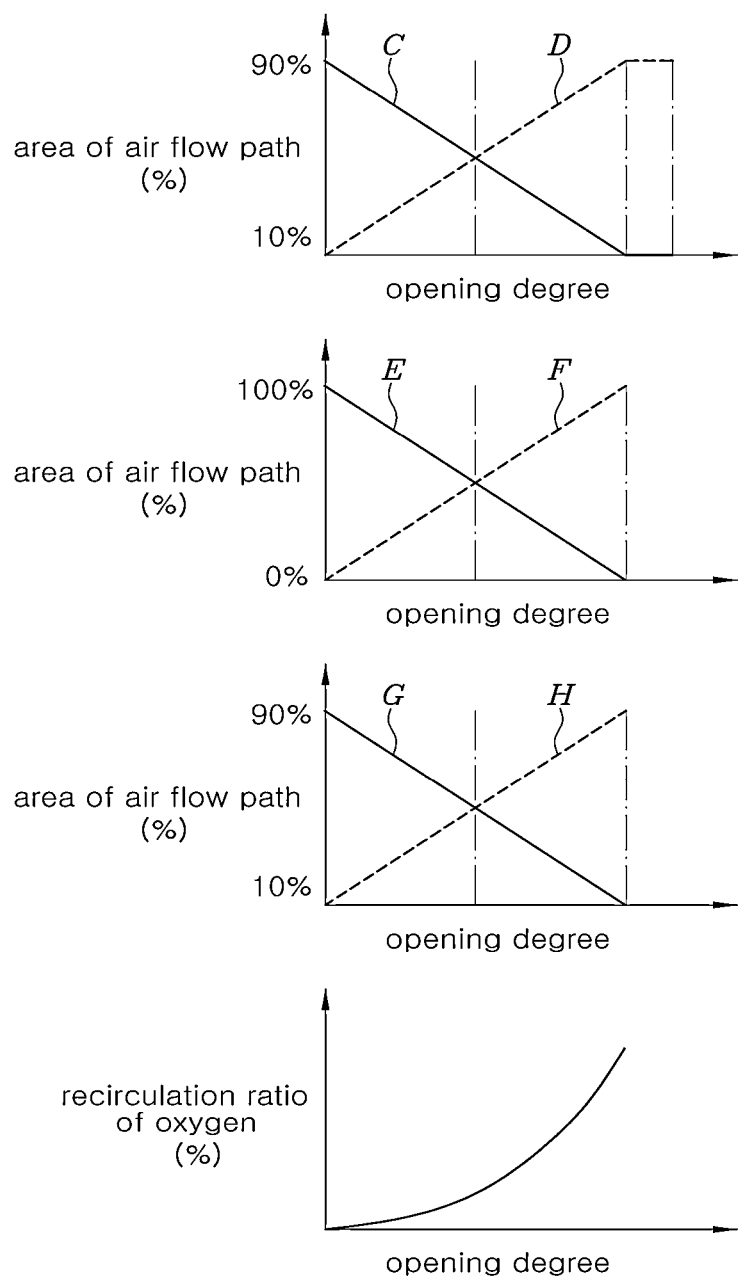
FIG. 3 is a graph showing a change in an oxygen recirculation ratio according to a control of the opening degrees of an air recirculation valve, an air exhaust valve, and an air supply valve.
Figure 4:
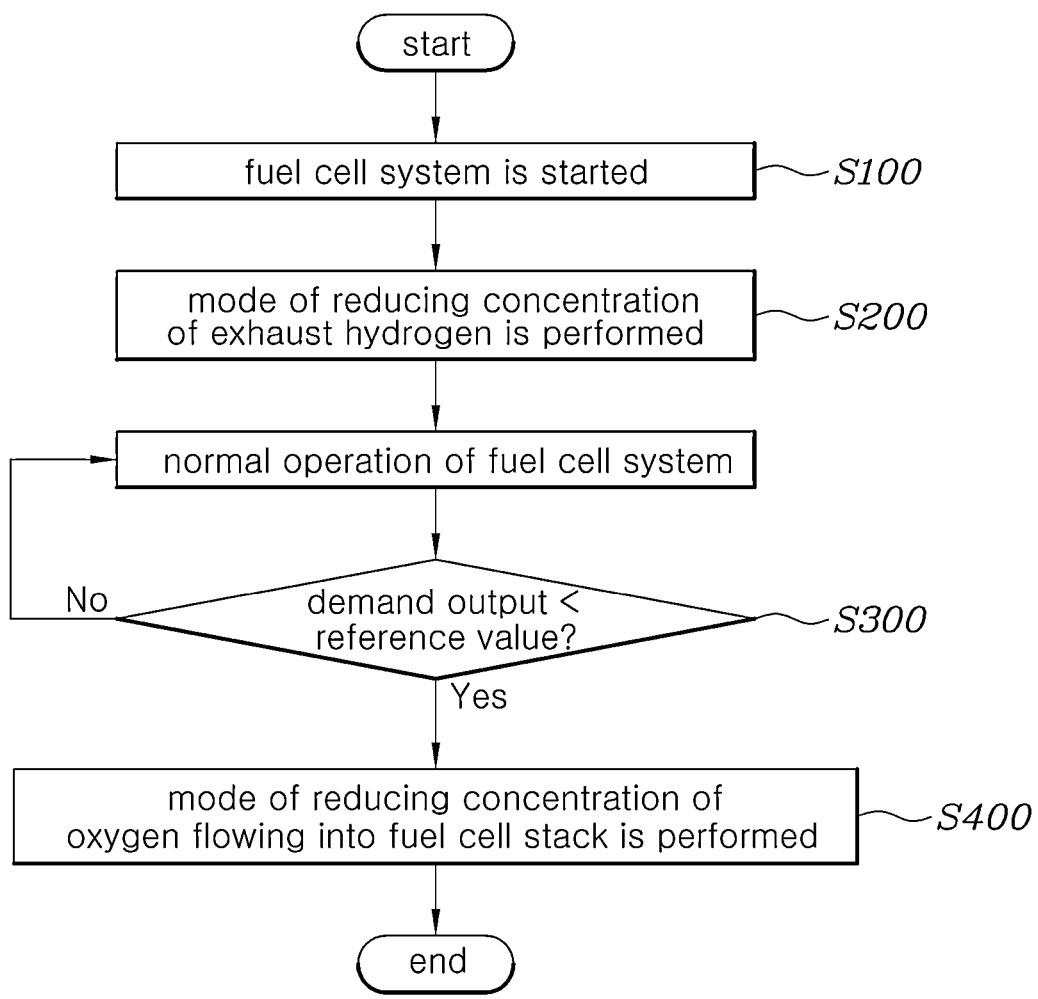
FIG. 4 is a flowchart of a control method of a fuel cell system according to an embodiment of the present disclosure.

FIG. 1 is a view showing a fuel cell system according to an embodiment of the present disclosure. FIG. 2 is a view showing an air supply valve 600 of a fuel cell system according to an embodiment of the present disclosure. FIG. 3 is a graph showing that a change in an oxygen recirculation ratio according to a control of the opening degrees of an air recirculation valve 400, an air exhaust valve 700, and an air supply valve 600. FIG. 4 is a flowchart of a control method of a fuel cell system according to an embodiment of the present disclosure.

In order to help understand the present disclosure, a configuration of a general fuel cell system and a conventional control method for controlling the same are briefly described. Differentiating features of each component and step of the present disclosure are described together.

A general fuel cell system includes a fuel cell stack in which a plurality of fuel cells is stacked, a fuel supply system for supplying hydrogen used as fuel to an anode 12 of the fuel cell stack 10, an air supply system for supplying oxygen required for an electrochemical reaction to a cathode 11 of the fuel cell stack 10, and the like.

In particular, the air supply system includes an air supply line 100 for supplying air to the cathode 11 of the fuel cell stack 10 and an air exhaust line 200 for discharging the air after reaction that has passed through the cathode 11 to the outside. Accordingly, the fuel cell system according to the present disclosure has the air supply line 100 and the air exhaust line 200 as basic components.

Referring to FIG. 1, an air compressor 20 for sucking in outside air supplied to the cathode 11 of the fuel cell stack 10 is provided in the air supply line 100. A humidifier and an air supply valve 600 is provided over both the air supply line 100 and the air exhaust line 200. An air exhaust valve 700 is provided in the air exhaust line 200 to control the flow rate of the air after reaction that is discharged through the exhaust port after passing through the humidifier 30.

In the fuel cell, moisture acts as a transfer medium for hydrogen ions, so it is necessary to humidify the air supplied to the cathode 11 with appropriate moisture. Accordingly, before the outside air sucked through the air compressor 20 is supplied to the cathode 11, a humidification process through the humidifier 30 is required.

For reference, the humidifier 30 is generally formed with a separate membrane through which moisture can permeate therein. Based on this membrane, the inside is called a lumen side and the outside is called a shell side. The air flowing into the humidifier 30 through the air supply line 100 passes through the lumen side, and the air reflowing into the humidifier 30 through the air exhaust line 200 flows into the shell side. Since the air reflowing into the air humidifier 30 through the air exhaust line 200 contains a small amount of moisture generated according to the driving of the fuel cell stack 10, the air flowing into the air humidifier 30 through the supply line 100 is humidified with the moisture as the moisture is transmitted from the shell side to the lumen side.

In other words, according to such an operating principle, the humidifier 30 is provided over both the air supply line 100 and the air exhaust line 200.

In addition, the air supply valve 600 may be provided separately in each of the air supply line 100 and the air exhaust line 200. However, as shown in FIG. 2, the air supply valve 600 may be formed to include a flow path (A) connected to the air supply line 100 and a flow path (B) connected to the air exhaust line 200 at the same time.

In this case, since the air supply valve 600 is provided in the air supply line 100 and the air exhaust line 200 at the same time, modularization of each component of the fuel cell system is facilitated, and the production cost can be reduced. Accordingly, the air supply valve 600 in one embodiment is formed as shown in FIG. 2. Thus, FIG. 1 shows a state in which the air supply valve 600 formed as shown in FIG. 2 is applied.

On the other hand, the oxygen contained in the air supplied to the cathode 11 generates electrical energy through an electrochemical reaction with the hydrogen supplied to the anode 12. The oxygen generates water and high-temperature heat as a byproduct of the reaction, which is discharged to the outside of the vehicle through the air exhaust line 200 together with exhaust gases (such as unreacted hydrogen and oxygen).

Since unreacted hydrogen is contained in these exhaust gases and byproducts (hereinafter, referred to as 'air after reaction'), residual hydrogen remaining in the air exhaust line 200 without being completely discharged is present in the air exhaust line 200.

Conventionally, in order to minimize the risk of explosion or ignition due to such residual hydrogen, residual hydrogen is discharged by driving the air compressor 20 when the fuel cell operation is terminated or restarted. However, there is a problem in that additional output is required for driving the air pressor 20 and the legal standards for hydrogen exhaust concentration cannot be met as the residual hydrogen is discharged at once.

Accordingly, the fuel cell system according to the present disclosure includes a separate air recirculation line 300 connecting the air exhaust line 200 and the air supply line 100. The fuel cell system can maintain the concentration of hydrogen exhausted from the fuel cell system below a certain level without additional driving of a device such as the air compressor 20 through the control of the opening degree of the air recirculation valve 400 provided in the air recirculation line 300.

In addition, the air compressor 20 provided in the air supply line 100 is generally applied with an air foil bearing. Accordingly, there is a disadvantage in that it is not possible to precisely control the number of rotations of the air compressor 20 in the low output section of the fuel cell vehicle. Thus, there is a problem in that the minimum demand output in the low power section is excessively increased.

Conventionally, a temporary fuel cell stoppage or minimum flow rate control has been conducted to avoid the excessive output problem. However, this may cause problems in that the durability life of the fuel cell system is shortened due to oxygen crossover, deterioration of the fuel cell stack 10, and the like.

Accordingly, the fuel cell system according to the present disclosure not only enables precise control in a low output section without temporarily stopping the fuel cell or performing minimum flow control, but also prevents crossover of oxygen to minimize side effects such as deterioration of the fuel cell stack 10 by reducing the concentration of oxygen flowing into the cathode 11 through the aforementioned control of the opening degree of the air recirculation valve 400.

Hereinafter, with reference to the accompanying drawings, the key features of each component and step of the present disclosure are described in more detail.

FIG. 1 is a view showing a fuel cell system according to an embodiment of the present disclosure.

Referring to FIG. 1, the fuel cell system according to the present disclosure includes the air supply line 100 for supplying air to the fuel cell stack 10. The system also includes the air exhaust line 200 for discharging the air after reaction to the outside. The system also includes the air recirculation line 300 having one side branched from the air exhaust line 200 and the other side connected to the air supply line 100 to recirculate the air after reaction. The system also includes the air recirculation valve 400 provided in the air recirculation line 300 to control the degree of recirculation of the air after reaction. The system also includes the controller 500 for controlling the opening degree of the air recirculation valve 400 when the recirculation of the air after reaction is required.

The controller 500 according to an embodiment of the present disclosure may be implemented by a non-volatile memory (not shown) configured to store an algorithm configured to control the operation of various components of a vehicle or data regarding the software commands for reproducing the algorithm. The controller 500 may also be implemented by a processor (not shown) configured to perform operations described below using the data stored in the memory. Here, the memory and the processor may be implemented as separate chips. Alternatively, the memory and processor may be implemented as a single chip integrated with each other, and the processor may take the form of one or more processors.

Specifically, the outside air of the vehicle is introduced into the fuel cell stack 10 along the air supply line 100. The outside air introduced into the fuel cell stack generates electric energy through an electrochemical reaction with hydrogen and then is discharged to the outside of the vehicle along the air exhaust line 200.

At this time, the air after reaction discharged along the air exhaust line 200 contains unreacted hydrogen as mentioned above (existence of residual hydrogen in the air exhaust line 200).

In general, hydrogen is likely to explode even with a small spark such as static electricity in most areas where the hydrogen concentration in the air is relatively low or high between 4% and 75%. Also, hydrogen has strong explosive properties as the minimum energy required for ignition is also 1/15th that of gasoline.

In addition, since hydrogen has a small molecular size, it may penetrate into a metal container or pipe for storing hydrogen and cause microcracks.

Therefore, in the case of a fuel cell vehicle that generally uses hydrogen as a fuel, it is necessary to minimize the residual hydrogen in the air exhaust line 200 to prepare for an explosion and to prevent microcracks in the pipe.

For reference, the hydrogen remaining inside the fuel cell stack 10 may be removed together with oxygen through a cathode oxygen depletion (COD) heater. However, in order to discharge the residual hydrogen remaining in the pipe in which the flow path is formed, such as the air discharge line 200, additional control (e.g., additional driving of the air compressor 20, etc.) is required.

However, when such additional control is performed, there is a problem in that a separate output is required or the legal standard of the hydrogen exhaust concentration cannot be satisfied as the residual hydrogen is discharged at once.

In order to solve this problem, the fuel cell system according to the present disclosure is provided with the air recirculation line 300 having one side branched from the air exhaust line 200 and the other side connected to the air supply line 100 to recirculate the air after reaction. Thus, the air after reaction is recirculated to the fuel cell stack 10 without being discharged to the outside of the vehicle.

The hydrogen and oxygen included in the air after reaction recirculated to the fuel cell stack 10 are removed through an electrochemical reaction inside the fuel cell stack 10.

The air recirculation line 300 is provided with an air recirculation valve 400 for controlling the degree of recirculation of the air after reaction. The opening degree of the air recirculation valve 400 is controlled by the controller 500.

In other words, it is possible to reduce the concentration of hydrogen exhausted from the fuel cell system without additional driving of a device such as the air compressor 20, by recirculating the air after reaction into the fuel cell stack 10 along the air recirculation line 300 through the control of the opening degree of the air recirculation valve 400.

On the other hand, the air recirculation valve 400 of the fuel cell system according to the present disclosure is provided in the air recirculation line 300, for example, at the point where the air recirculation line 300 and the air supply line 100 are connected.

This is to control the degree of recirculation of the air after reaction (recirculation ratio) and at the same time control the amount of outside air inflow (amount of outside air inflow) by installing the air recirculation valve 400 near the point of outside air inlet connected to the air supply line 100.

In other words, the air recirculation valve 400 may be provided at any point of the air recirculation line 300. However, when provided at a point where the air recirculation line 300 and the air supply line 100 are connected, there is an advantage in that the recirculation ratio and the amount of outside air inflow can be controlled simultaneously with only one valve.

Accordingly, there is no need to provide a separate valve for controlling the amount of outside air inflow, so material cost is reduced, and the control logic is simplified.

Furthermore, when the opening degree of the air recirculation valve 400 is controlled to increase the recirculation ratio but decrease the amount of outside air inflow, the concentration of the oxygen flowing into the cathode 11 of the fuel cell stack 10 along the air supply line 100 can be reduced.

In other words, by reducing the concentration of oxygen flowing into the cathode 11, it is possible to implement the low power driving of the fuel cell vehicle.

In other words, the low power driving of the fuel cell vehicle can be implemented without a temporary stoppage of the fuel cell or the minimum flow rate control that is conventionally performed to avoid the problem of excessive rise of the minimum demand output (excessive output problem in the low output section) due to the impossibility of precise control of the rotational speed of the air compressor 20 in a low output section.

Accordingly, it is possible to solve the problem of shortening the durability of the fuel cell system due to oxygen crossover, deterioration of the fuel cell stack 10, and the like, which are problems in the conventional control method.

For reference, here, the air recirculation valve 400 is desirably formed as a 3-way valve, as shown in FIG. 1, for simultaneous control of the recirculation ratio and the amount of outside air inflow.

The simultaneous adjustment of the recirculation ratio and the amount of outside air inflow is controlled according to the control of the opening degree of the air recirculation valve 400. At this time, the control of the opening degree of the air recirculation valve 400 is performed so that the recirculation ratio and the amount of outside air inflow are adjusted in opposite directions. In other words, when the recirculation ratio gradually increases, the amount of outside air inflow decreases in proportion to it. On the contrary, when the recirculation ratio gradually decreases, the amount of outside air inflow increases in proportion to it.

This can be easily seen from the graph shown in the first from the top of FIG. 3. For reference, the x-axis in FIG. 3 is expressed as the amount of outside air inflow (D).

In other words, the case where the recirculation ratio (C) is higher than the amount of outside air inflow (D) is indicated by a low opening degree of the air recirculation valve 400 (close to a closed status). On the contrary, the case where the recirculation ratio (C) is lower than the amount of outside air inflow (D) is indicated by a high opening degree of the air recirculation valve 400 (close to an open state).

However, this is only an illustration to help the understanding of the present disclosure, and it is apparent that the x-axis may be expressed as the recirculation ratio (C). In other words, it should not be understood that the content of the present disclosure is limited by the expression of such a graph.

Hereinafter, in order to help the understanding of the present disclosure, the x-axis is described as the amount of outside air inflow (D) as shown in FIG. 3.

In other words, in the following description, it can be understood that 'closed-direction control of the air recirculation valve 400' means controlling the recirculation ratio (C) to be higher than the amount of outside air inflow (D), and 'open-direction control of the air recirculation valve 400' means controlling the recirculation ratio (C) to be lower than the amount of outside air inflow (D).

FIG. 1 is a view showing a fuel cell system according to an embodiment of the present disclosure. FIG. 2 is a view showing the air supply valve 600 of a fuel cell system according to an embodiment of the present disclosure.

Referring to FIGS. 1 and 2, the fuel cell system according to the present disclosure further includes the air supply valve 600 that is provided in the air supply line 100 to supply air to the fuel cell stack 10 and includes a bypass line 610 connected to the air exhaust line 200 therein. The controller 500 may control the opening degree of the air supply valve 600 and at the same time control the opening degree of the air recirculation valve 400 when recirculation of the air after reaction is required.

First, the bypass line 610 of the air supply valve 600 is described in detail with reference to FIG. 2. As mentioned above, the air supply valve 600 may be separately provided in each of the air supply line 100 and the air exhaust line 200. However, it may be formed in one embodiment to simultaneously include the flow path (A) connected to the air supply line 100 and the flow path (B) connected to the air exhaust line 200.

In addition, the plurality of flow paths (A, B) may be connected through the bypass line 610 provided therein. The bypass line 610 allows a portion of the air flowing into the fuel cell stack 10 along the air supply line 100 to be discharged through the air exhaust line 200.

For example, when the plurality of flow paths (A, B) is closed and the bypass line 610 is opened, the air flowing along the air supply line 100 flows along the air exhaust line 200 without flowing into the fuel cell stack 10.

Conversely, when the plurality of flow paths (A, B) is opened and the bypass line 610 is blocked, the entire amount of air flowing along the air supply line 100 flows into the fuel cell stack 10.

Here, the opening amounts of the plurality of flow paths (A, B) and the bypass line 610 are adjusted in opposite directions. In other words, when the opening amounts of the plurality of passages (A, B) gradually increase, the opening amount of the bypass line 610 decreases in proportion to the increase of the opening amounts of the plurality of passages (A, B). On the contrary, when the opening amounts of the plurality of passages (A, B) gradually decrease, the opening amount of the bypass line 610 increases in proportion to the decrease of the opening amounts of the plurality of passages (A, B).

This can be easily seen from the graph shown in the second from the top of FIG. 3. For reference, the x-axis in FIG. 3 is expressed as the opening degree (F) of the plurality of flow paths (A, B). Here, E denotes an opening degree of the bypass line 610.

In other words, the state in which the plurality of flow paths (A, B) is closed and the bypass line 610 is opened is represented by a fully closed state (0%) of the air supply valve 600. Conversely, the state in which the plurality of flow paths (A, B) is opened and the bypass line 610 is closed is represented by a fully open state (100%) of the air supply valve 600.

However, this is only an illustration for helping understanding of the present disclosure, and it is apparent that the opening degree (E) of the bypass line 610 may be expressed as a reference. In other words, it should not be understood that the content of the present disclosure is limited by the expression of such a graph.

Hereinafter, in order to help the understanding of the present disclosure, the x-axis is described as the opening degrees (F) of the plurality of flow paths (A, B) as shown in FIG. 3.

In other words, in the following description, it can be understood that the 'closed-direction control of the air supply valve 600' means that the opening amount (F) of the plurality of flow paths (A, B) is controlled to decrease and the opening amount (E) of the bypass line 610 is controlled to increase, and the 'open-direction control of the air supply valve 600' means that the opening amount (F) of the plurality of flow paths A and B is controlled to increase and the opening amount (E) of the bypass line 610 is controlled to decrease.

As the opening amount (F) of the plurality of flow passages (A, B) and the opening amount (E) of the bypass line 610 are controlled as described above, the flow rate of air flowing into the fuel cell stack 10 can be controlled according to the output required by the driver of the vehicle.

For example, when the air supply valve 600 is controlled in the closed-direction, the degree to which the air flowing along the air supply line 100 flows into the air exhaust line 200 through the bypass line 610 increases rather than the degree to which the air flowing along the air supply line 100 flows into the cathode 11 through the air supply valve 600.

Accordingly, since the flow rate of air flowing into the cathode 11 is reduced, the pressure in the fuel cell stack 10 may be temporarily reduced. The air after reaction that has passed through the cathode 11 flows into the air recirculation line 300 together with the air flowing into the air exhaust line 200 through the bypass line 610.

Then, the controller 500 controls the closed-direction of the air recirculation valve 400 provided in the air recirculation line 300 (increasing the recirculation ratio, decreasing the amount of outside air inflow). Thus, the percentage of oxygen contained in the air flowing into the air supply line 100 is reduced. In other words, the controller 500 of the fuel cell system according to the present disclosure controls the opening degree of the air supply valve 600 and at the same time controls the opening degree of the air recirculation valve 400 to reduce the oxygen concentration when recirculation of the air after reaction is required.

As a result, by simultaneously controlling the air recirculation valve 400 and the air supply valve 600 in this way, even if the flow rate of the air flowing into the cathode 11 is temporarily reduced, the air with the reduced oxygen concentration is recirculated into the cathode 11 along the air supply line 100. Thus, the flow rate of air flowing into the cathode 11 and the pressure in the fuel cell stack 10 can be maintained at an appropriate level.

In other words, when a low output is implemented by reducing the flow rate of air flowing into the fuel cell stack 10, a problem in that the fuel cell stack 10 is deteriorated may occur according to a difference in supply pressures of oxygen and hydrogen in the fuel cell stack 10. However, when a low output is implemented in such a way that the oxygen concentration of the air flowing into the fuel cell stack 10 is reduced, there is an advantage in that a low output can be implemented while maintaining the supply pressure difference between oxygen and hydrogen in the fuel cell stack 10 at an appropriate level.

In addition, since low output is implemented by using only the control of the opening degree of the air supply valve 600 and the air recirculation valve 400 without performing control such as temporarily stopping the fuel cell, not only is it possible to precisely control the low power section, but it also has a beneficial effect on the durability of the fuel cell.

Subsequently, a case in which the air supply valve 600 is controlled in the open-direction is described. It may be understood that the 'open-direction control of the air supply valve 600' is performed in order to lower the concentration of hydrogen exhausted from the fuel cell system.

Specifically, when the air supply valve 600 is controlled in the open-direction, the degree to which the air flowing along the air supply line 100 flows into the cathode 11 increases rather than the degree to which air flowing along the air supply line 100 flows into the air exhaust line 200 through the bypass line 610.

At this time, the air recirculation valve 400 is controlled to increase the recirculation ratio, but to decrease the amount of outside air inflow, as in the case of implementing the low output above.

Therefore, the air after reaction that has been introduced into the cathode 11 and has undergone an electrochemical reaction is reintroduced into the cathode 11 of the fuel cell stack 10 through the air recirculation line 300. The residual hydrogen and oxygen contained in the air after reaction that has recirculated into the fuel cell stack are removed through an electrochemical reaction inside the fuel cell stack 10.

As a result, by recirculating the air after reaction into the fuel cell stack 10 along the air recirculation line 300 through the simultaneous control of the air recirculation valve 400 and the air supply valve 600 as described above, there is an effect that the concentration of hydrogen exhausted from the fuel cell system can be lowered without additional driving of the device such as the air compressor 20.

On the other hand, referring to FIG. 1, the fuel cell system according to the present disclosure further includes an air exhaust valve 700 provided in the air exhaust line 200 to discharge the air after reaction that has passed through the fuel cell stack 10 to the outside. The controller 500 may control the opening degree of the air exhaust valve 700 and at the same time may control the opening degree of the air recirculation valve 400 when recirculation of the air after reaction is required.

Since the air after reaction that has passed through the fuel cell stack 10 is discharged to the outside through the air exhaust line 200, an exhaust port communicating with the outside may be formed at one side of the air exhaust line 200. This is apparent in the technical field of the present disclosure, and a detailed description thereof has been omitted.

In addition, the air exhaust line 200 of the fuel cell system according to the present disclosure may be provided with the air exhaust valve 700 for controlling the flow rate of the air after reaction discharged through the exhaust port.

The air exhaust valve 700 basically serves to discharge the air after reaction that has passed through the fuel cell stack 10 to the outside. When recirculation of air after reaction is required, it can be controlled to minimize the external discharge of the air after reaction and to increase the recirculation rate.

In other words, when low output is implemented or when it is desired to lower the concentration of exhaust hydrogen, the controller 500 according to the present disclosure may control the opening degree of the air exhaust vale 700 such that the flow amount (recirculation ratio) of the air after reaction flowing to the air recirculation line 300 becomes larger than the flow amount (amount of external exhaust) of the air after reaction flowing to the exhaust port.

At this time, the amount of external exhaust and the recirculation ratio are controlled in opposite directions. In other words, when the recirculation ratio gradually increases, the amount of external exhaust decreases in proportion to it. On the contrary, when the recirculation ratio gradually decreases, the amount of external exhaust increases in proportion to it.

This can be easily seen from the graph shown in the third from the top of FIG. 3. For reference, the x-axis in FIG. 3 is expressed as the amount of external exhaust (H).

In other words, the case where the recirculation ratio (G) is higher than the amount of external exhaust (H) is indicated as a state where the opening degree of the air exhaust valve 700 is low (close to a closed state. On the contrary, the case where the recirculation ratio (G) is higher than the amount of external exhaust (H) is indicated as a state where the opening degree of the air exhaust valve 700 is high (close to an open state).

However, this is only an illustration to help the understanding of the present disclosure, and it is apparent that the x-axis may be expressed as the recirculation ratio (G). In other words, it should not be understood that the content of the present disclosure is limited by the expression of such a graph.

Hereinafter, in order to help the understanding of the present disclosure, the x-axis is described as the amount of external exhaust (H) as shown in FIG. 3.

In other words, in the following description, it can be understood that the 'closed-direction control of the air exhaust valve 700' means controlling the recirculation ratio (G) to be higher than the amount of external exhaust (H), and the 'open-direction control of the air exhaust valve 700' means controlling the recirculation ratio (G) to be lower than the amount of external exhaust (H).

In addition, the controller 500 of the fuel cell system according to the present disclosure controls the air recirculation valve 400 in the closed-direction (reducing the amount of outside air inflow (D), increasing the recirculation ratio (C)) when the air exhaust valve 700 is controlled.

In other words, by controlling the air exhaust valve 700 and at the same time controlling the air recirculation valve 400, the flow rate (amount of external exhaust) of the air after reaction discharged through the exhaust port can be minimized when recirculation of the air after reaction is required.

Accordingly, it is possible to minimize the influence of the flow rate (amount of external exhaust) of the air after reaction discharged through the exhaust port on the control of the recirculation rate of the air after reaction by the controller 500, so that the recirculation rate can be more precisely and accurately controlled.

On the other hand, when the recirculation of the air after reaction is required in the fuel cell system according to the present disclosure may be either in the mode of reducing the concentration of exhaust hydrogen or the mode of reducing the concentration of oxygen flowing into the fuel cell stack 10.

Here, when some of the hydrogen and oxygen contained in the air after reaction are not discharged to the outside and remain so that residual hydrogen is present in the air exhaust line 200, the 'mode of reducing the concentration of exhaust hydrogen' can refer to a case in which the air after reaction is recirculated into the fuel cell stack 10 to induce an electrochemical reaction to remove the residual hydrogen.

In addition, the 'mode of reducing the concentration of oxygen flowing into the fuel cell stack 10' can refer to a mode in which a low output operation of the fuel cell system is implemented by reducing the oxygen concentration of the inflow air while maintaining the pressure of the air flowing into the fuel cell stack 10 at an appropriate level.

In each mode, the controller 500 can control the opening degrees of the air recirculation valve 400, the air supply valve 600, and the air exhaust valve 700 differently, which are individually described in detail below.

First, the 'mode of reducing the concentration of exhaust hydrogen' is described.

The fuel cell system according to the present disclosure further includes the air supply valve 600 that is provided in the air supply line 100 to supply air to the fuel cell stack 10 and includes the bypass line 610 connected to the air exhaust line 200 therein. In the case of the mode of reducing the concentration of exhaust hydrogen, the controller 500 may close the opening degree of the air recirculation valve 400 according to a preset reference value and may fully open the air supply valve 600.

Since the specific configuration or embodiment of the air supply valve 600 is the same as described above with reference to FIGS. 1 and 2, a description thereof has been omitted.

In order to remove residual hydrogen in the 'mode of reducing the concentration of exhaust hydrogen', it is necessary to recirculate the residual hydrogen to the fuel cell stack 10 to induce an electrochemical reaction, so the air supply valve 600 is controlled in the open-direction. In other words, in FIG. 2, the plurality of flow paths (A, B) is controlled to be opened and the bypass line 610 is controlled to be closed.

At this time, it is desirable to control so that the plurality of flow paths (A, B) is fully opened and the bypass line 610 is fully closed.

This is because, if the bypass line 610 is partially opened, some of the residual hydrogen introduced into the air supply valve 600 through the air supply line 100 along the air recirculation line 300 can be introduced into the air exhaust line 200 through the bypass line 610.

In other words, in the 'mode of reducing the concentration of exhaust hydrogen', the fuel cell system according to the present disclosure reliably remove the residual hydrogen present in the air exhaust line 200 by controlling the air supply valve 600 to be fully opened.

At the same time, the controller 500 closes the opening degree of the air recirculation valve 400 according to a preset reference value.

Here, the preset reference value may be understood to mean a reference value set such that a minimum amount of outside air is introduced to induce an electrochemical reaction inside the fuel cell stack 10 while increasing the recirculation ratio of residual hydrogen. The reference value set as described above may be stored in a memory (not shown) provided in the controller 500 as an experimental value data obtained through a plurality of experiments.

For example, as shown in the first graph from the top of FIG. 3, the preset reference value may be set such that the recirculation ratio (C) is 90% and the amount of outside air inflow (D) is 10%.

Accordingly, the minimum amount of outside air is introduced into the fuel cell stack 10 to induce an electrochemical reaction of the residual hydrogen introduced with the outside air, and as a result, the residual hydrogen can be removed through the induced electrochemical reaction.

In addition, the fuel cell system according to the present disclosure further includes the air exhaust valve 700 that is provided in the air exhaust line 200 to discharge the air that has passed through the fuel cell stack 10 to the outside. In the case of the mode of reducing the concentration of exhaust hydrogen, the controller 500 closes the opening degrees of the air recirculation valve 400 and the air exhaust valve 700 according to a preset reference value and fully opens the air supply valve 600.

In particular, when the air exhaust valve 700 is further included in the 'mode of reducing the concentration of exhaust hydrogen' described above, it can be understood that the controller 500 controls the air recirculation valve 400 and the air supply valve 600 and simultaneously controls the air exhaust valve 700.

Therefore, since the control method and principle of the air recirculation valve 400 and the air supply valve 600 by the controller 500 are the same as described above, a description thereof has been omitted In the following description, the particular control method or principle of the air exhaust valve 700 by the controller 500 is described.

The controller 500 controls the opening degree of the air exhaust valve 700 to be closed at a preset reference value. Prior to the description of the preset reference value, it is necessary to understand the characteristics of the air exhaust valve 700.

As mentioned above, the air exhaust valve 700 is configured to minimize the influence of the amount of external exhaust on the control of the recirculation ratio.

On the other hand, when the amount of external exhaust is set to 0% in order to minimize the influence of the amount of external exhaust, back pressure may be formed in the air exhaust line 200 as the exhaust port communicating with the outside is completely closed. In this case, the residual hydrogen flows from the air exhaust line 200 to the air recirculation line 300 and is not recirculated, and thus a problem of a reverse flow may occur.

Therefore, the air exhaust valve 700 has a characteristic that cannot maintain 100% airtightness in order to prevent such back pressure from being formed. In other words, the air exhaust valve 700 needs to maintain a minimum amount of external exhaust at a certain level due to its characteristics.

As a result, it can be understood that the preset reference value when controlling the opening degree of the air exhaust valve 700 means a reference value set to maintain the minimum amount of external exhaust as described above. The reference value set as described above may be stored in a memory (not shown) provided in the controller 500 as an experimental value data obtained through a plurality of experiments.

For example, as shown in the third graph from the top of FIG. 3, the preset reference value may be set such that the recirculation ratio (G) is 90% and the amount of external exhaust (H) is 10%.

Accordingly, by maintaining the minimum amount of external exhaust, back pressure is prevented from being formed in the air exhaust line 200. Also, the amount of external exhaust can be minimized in the control of the recirculation ratio. Thus, precise control of the recirculation ratio is possible.

Next, the 'mode of reducing the concentration of oxygen flowing into the fuel cell stack 10' is described.

The fuel cell system according to the present disclosure further includes the air supply valve 600 that is provided in the air supply line 100 to supply the air to the fuel cell stack 10. The fuel cell system also includes the bypass line 610 connected to the air exhaust line 200 therein. In the case of the mode of reducing the concentration of oxygen flowing into the fuel cell stack 10, the controller 500 closes the opening degree of the air recirculation valve 400 and the air supply valve 600 according to a preset reference value based on a requested output.

The 'mode of reducing the concentration of oxygen flowing into the fuel cell stack 10' refers to a mode for implementing the low output operation of the fuel cell system and is different from the 'mode of reducing the concentration of exhaust hydrogen' discussed above.

In particular, in controlling the opening degree of the air supply valve 600, in the 'mode of reducing the concentration of exhaust hydrogen', the 'open-direction control of the air supply valve 600' is performed. On the contrary, in the 'mode of reducing the concentration of oxygen flowing into the fuel cell stack 10', the 'closed-direction control of the air supply valve 600' is performed.

In this case, the degree to which the air flowing along the air supply line 100 flows into the air exhaust line 200 through the bypass line 610 increases rather than the degree to which the air flowing along the air supply line 100 flows into the cathode 11 through the air supply valve 600. Thus, the pressure in the fuel cell stack 10 may be temporarily reduced according to a decrease in the flow rate of air flowing into the cathode 11.

However, at the same time, the controller 500 recirculates the air into the cathode 11 in a state in which the concentration of oxygen has been reduced to the cathode 11 by performing the closed-direction control of the air recirculation valve 400 (increasing the recirculation ratio, reducing the amount of outside air inflow). Thus, the operation in a low output section can be implemented while maintaining the pressure in the fuel cell stack 10 at an appropriate level.

At this time, the controller 500 closes the opening degrees of the air recirculation valve 400 and the air supply valve 600 according to a preset reference value based on a requested output.

Here, the 'preset reference value based on a requested output' may be understood as a reference value set to be changed as the requested output of the driver of the vehicle changes. The reference value set as described above may be stored in a memory (not shown) provided in the controller 500 as an experimental value data obtained through a plurality of experiments.

In addition, the fuel cell system according to the present disclosure further includes the air exhaust valve 700 that is provided in the air exhaust line 200 to discharge the air that has passed through the fuel cell stack 10 to the outside. In the case of the mode of reducing the concentration of oxygen flowing into the fuel cell stack 10, the controller 500 closes the opening degrees of the air recirculation valve 400, the air exhaust valve 700, and the air supply valve 600 according to a preset reference value based on the demand output.

In particular, when the air exhaust valve 700 is further included in the 'mode of reducing the concentration of oxygen flowing into the fuel cell stack 10' as described above, it can be understood that the controller 500 controls the air recirculation valve 400 and the air supply valve 600 and simultaneously controls the air exhaust valve 700.

Therefore, since the control method and principle of the air recirculation valve 400 and the air supply valve 600 by the controller 500 are the same as described above, a description thereof has been omitted.

In addition, the specific control method or principle of the air exhaust valve 700 by the controller 500 is also performed similarly to that described in the case where the air exhaust valve 700 is further included in the 'mode of reducing the concentration of exhaust hydrogen'. Thus, in the following description, only the difference from the 'mode of reducing the concentration of exhaust hydrogen' is briefly described.

In other words, the control of the opening degree of the air exhaust valve 700 in the 'mode of reducing the concentration of oxygen flowing into the fuel cell stack 10' has the same purpose as the control of the opening degree of the air exhaust valve 700 in the 'mode of reducing the concentration of exhaust hydrogen' in that back pressure is prevented from being formed in the air exhaust line 200 by maintaining the minimum external exhaust amount. Also, the influence of the amount of external exhaust on controlling the recirculation ratio is minimized to enable precise control of the recirculation ratio.

However, there is a difference in that the reference value serving as the determining criterion for controlling the opening degree of the air exhaust valve 700 in the 'mode of reducing the concentration of oxygen flowing into the fuel cell stack 10' means 'a preset reference value based on a demand output'.

In other words, the reference value in the 'mode of reducing the concentration of oxygen flowing into the fuel cell stack 10' may be understood as a reference value set to be changed as the demand output of the driver of the vehicle changes. The reference value set as described above may be stored in a memory (not shown) provided in the controller 500 as an experimental value data obtained through a plurality of experiments.

FIG. 4 is a flowchart of a control method of a fuel cell system according to an embodiment of the present disclosure.

Referring to FIG. 4, the control method of the fuel cell system according to the present disclosure includes the steps of performing the mode of reducing the concentration of exhaust hydrogen by the controller (S200) and performing the mode of reducing the concentration of oxygen flowing into the fuel cell stack by the controller (S400).

Here, the 'mode of reducing the concentration of exhaust hydrogen' and the 'mode of reducing the concentration of oxygen flowing into the fuel cell stack' are the same as described above, and thus descriptions thereof have been omitted.

Meanwhile, in each mode, the controller may differently control the execution time of each mode, which is individually described in detail below.

First, the step of performing the mode of reducing the concentration of exhaust hydrogen (S200) in the control method of the fuel cell system according to the present disclosure may be characterized in that it is performed when the fuel cell system is started (S100).

In general, since the reaction between hydrogen and oxygen occurs actively in a fuel cell under a specific temperature condition, the operations for raising the temperature of the fuel cell system inside the vehicle are performed below a specific temperature (e.g., about −2° C.).

For this purpose, conventionally, a method of increasing the temperature inside the fuel cell by mounting a separate heater in the fuel cell system has been used. However, in this method, air heated through a heater is supplied to the cathode, and the anode can be heated only by heat conduction from the cathode.

In other words, there is a limit to rapidly increasing the internal temperature of the fuel cell stack to a target level and there is a problem in that the target temperature cannot be precisely adjusted because it is dependent on heat conduction.

Accordingly, in the control method of the fuel cell system according to the present disclosure, the temperature of the fuel cell stack is raised through thermal energy generated as the result of the electrochemical reaction of residual hydrogen by performing the mode of reducing the concentration of exhaust hydrogen when the fuel cell system is started. This is to raise the internal temperature of the fuel cell stack to a target level without relying on heat conduction.

Accordingly, there is no need to provide a separate heater. The thermal energy according to the electrochemical reaction of residual hydrogen is utilized, thereby increasing power generation efficiency.

For reference, in the present disclosure, the mode of reducing the concentration of exhaust hydrogen does not necessarily have to be performed only when the fuel cell system is started. It is apparent that the mode may be performed during operation of the fuel cell system or immediately after the operation of the fuel cell system is ended.

However, implementing the mode of reducing the concentration of exhaust hydrogen when starting the fuel cell system is more meaningful in that it not only has the effect of removing residual hydrogen, but also increases the power generation efficiency of the fuel cell system.

Next, the step of performing the mode of reducing the concentration of oxygen flowing into the fuel cell stack (S400) in the control method of the fuel cell system according to the present disclosure is characterized in that it is performed when the demand output during operation of the fuel cell system is less than or equal to a predetermined reference value (S300).

In the present disclosure, the 'mode of reducing the concentration of oxygen flowing into the fuel cell stack' refers to a mode for implementing the low power operation of the fuel cell system, and it needs to determine whether the demand output of the vehicle user corresponds to the low power section.

Therefore, the control method of the fuel cell system according to the present disclosure is to perform the mode of reducing the concentration of oxygen flowing into the fuel cell stack only when the demand output during operation of the fuel cell system is less than or equal to a predetermined reference value.

In other words, the 'predetermined reference value' refers to a reference value set to determine whether the demand output of the fuel cell system corresponds to the low output section, which may be stored in a memory (not shown) provided in the controller.

As a result, when the demand output is greater than a predetermined reference value during operation of the fuel cell system, the fuel cell system is continuously operated according to the demand output but only performs the mode of reducing the concentration of oxygen flowing into the fuel cell stack when the demand output is less than or equal to the predetermined reference value. Thus, the operation function of a low output section is implemented.

Therefore, as described above, according to the fuel cell system and control method thereof according to the present disclosure, it is possible to satisfy the hydrogen emission regulation standards by maintaining the concentration of hydrogen exhausted, from the fuel cell system below a certain level without additional operation of a device such as an air compressor, through the air recirculation line and the air recirculation valve for recirculating the air discharged from the cathode of the fuel cell stack into the cathode.

Furthermore, by controlling the concentration of oxygen flowing into the fuel cell stack for operation in the low power section, it not only enables precise control in the low output section without temporarily stopping the fuel cell or performing minimum flow control, but also has the advantage of minimizing side effects such as fuel cell stack deterioration by preventing oxygen crossover.

Although shown and described in relation to specific embodiments of the disclosure, it should be apparent to those of ordinary skill in the art that the present disclosure can be variously improved and changed without departing from the spirit of the present disclosure provided by the following claims.

What is claimed is:

1. A fuel cell system comprising:
   an air supply line to supply air to a fuel cell stack and an air exhaust line to discharge air after reaction to an outside;
   an air recirculation line having one side branched from the air exhaust line and the other side connected to the air supply line to recirculate the air after reaction;
   an air recirculation valve provided in the air recirculation line to control a degree of recirculation of the air after reaction;
   a controller to control an opening degree of the air recirculation valve when recirculation of the air after reaction is required; and
   an air supply valve provided in the air supply line to supply the air to the fuel cell stack and having a bypass line connected to the air exhaust line therein,
   wherein the controller controls the opening degree of the air supply valve and at the same time controls the opening degree of the air recirculation valve when the recirculation of the air after reaction is required.

2. The fuel cell system according to claim 1, wherein the air recirculation valve is provided in the air recirculation line and is provided at a point where the air recirculation line and the air supply line are connected.

3. The fuel cell system according to claim 1, further comprising an air exhaust valve provided in the air exhaust line to discharge the air after reaction that has passed through the fuel cell stack to the outside,
   wherein, when the recirculation of the air after reaction is required, the controller controls the opening degree of the air recirculation valve and simultaneously controls the opening degree of the air exhaust valve.

4. The fuel cell system according to claim 1, wherein when the recirculation of the air after reaction is required is either a mode of reducing concentration of exhaust hydrogen or a mode of reducing concentration of oxygen flowing into the fuel cell stack.

5. The fuel cell system according to claim 4, further comprising an air supply valve provided in the air supply line to supply the air to the fuel cell stack and having a bypass line connected to the air exhaust line therein;
   wherein, in the mode of reducing the concentration of exhaust hydrogen, the controller closes the opening degree of the air recirculation valve according to a preset reference value and fully opens the air supply valve.

6. The fuel cell system according to claim 5, further comprising an air exhaust valve provided in the air discharge line to discharge the air that has passed through the fuel cell stack to the outside,
    wherein, in the mode of reducing the concentration of exhaust hydrogen, the controller closes the opening degrees of the air recirculation valve and the air exhaust valve according to the preset reference value and fully opens the air supply valve.

7. The fuel cell system according to claim 4, further comprising an air supply valve provided in the air supply line to supply the air to the fuel cell stack and having a bypass line connected to the air exhaust line therein,
    wherein, in the mode of reducing the concentration of oxygen flowing into the fuel cell stack, the controller closes the opening degrees of the air recirculation valve and the air supply valve according to a preset reference value based on a demand output.

8. The fuel cell system according to claim 7, further comprising an air exhaust valve provided in the air exhaust line to discharge the air that has passed through the fuel cell stack to the outside,
    wherein, in the mode of reducing the concentration of oxygen flowing into the fuel cell stack, the controller closes the opening degrees of the air recirculation valve, the air exhaust valve, and the air supply valve according to the preset reference value based on the demand output.

9. A control method of the fuel cell system according to claim 4, the control method comprising the steps of:
    performing the mode of reducing the concentration of exhaust hydrogen by the controller; and
    performing the mode of reducing the concentration of oxygen flowing into the fuel cell stack by the controller.

10. The control method according to claim 9, wherein the step of performing the mode of reducing the concentration of exhaust hydrogen is performed when the fuel cell system is started.

11. The control method according to claim 9, wherein the step of performing the mode for reducing the concentration of oxygen flowing into the fuel cell stack is performed when a demand output during operation of the fuel cell system is less than or equal to a predetermined reference value.

12. A fuel cell system comprising:
    an air supply line to supply air to a fuel cell stack and an air exhaust line to discharge air after reaction to an outside;
    an air recirculation line having one side branched from the air exhaust line and the other side connected to the air supply line to recirculate the air after reaction;
    an air recirculation valve provided in the air recirculation line to control a degree of recirculation of the air after reaction;
    a controller to control an opening degree of the air recirculation valve when recirculation of the air after reaction is required; and
    an air supply valve provided in the air supply line to supply the air to the fuel cell stack and having a bypass line connected to the air exhaust line therein,
    wherein when the recirculation of the air after reaction is required is either a mode of reducing concentration of exhaust hydrogen or a mode of reducing concentration of oxygen flowing into the fuel cell stack, and
    wherein, in the mode of reducing the concentration of oxygen flowing into the fuel cell stack, the controller closes the opening degrees of the air recirculation valve and the air supply valve according to a preset reference value based on a demand output.

\* \* \* \* \*